United States Patent
Cherepinsky et al.

(10) Patent No.: US 10,739,792 B2
(45) Date of Patent: Aug. 11, 2020

(54) TRAJECTORY CONTROL OF A VEHICLE

(71) Applicant: SIKORSKY AIRCRAFT CORPORATION, Stratford, CT (US)

(72) Inventors: Igor Cherepinsky, Sandy Hook, CT (US); Harshad S. Sane, Southbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 54 days.

(21) Appl. No.: 15/557,963

(22) PCT Filed: Mar. 10, 2016

(86) PCT No.: PCT/US2016/021808
§ 371 (c)(1),
(2) Date: Sep. 13, 2017

(87) PCT Pub. No.: WO2016/149039
PCT Pub. Date: Sep. 22, 2016

(65) Prior Publication Data
US 2018/0052472 A1    Feb. 22, 2018

Related U.S. Application Data

(60) Provisional application No. 62/134,322, filed on Mar. 17, 2015.

(51) Int. Cl.
*G05D 1/10* (2006.01)
*G08G 5/00* (2006.01)
(Continued)

(52) U.S. Cl.
CPC ............ *G05D 1/102* (2013.01); *B64C 13/16* (2013.01); *B64C 39/024* (2013.01); *G05D 1/101* (2013.01);
(Continued)

(58) Field of Classification Search
None
See application file for complete search history.

(56) References Cited

U.S. PATENT DOCUMENTS 5,706,011 A    1/1998  Huss et al.
6,334,344 B1   1/2002  Bonhoure et al.
(Continued)

FOREIGN PATENT DOCUMENTS

EP      2595136 A2     5/2013
WO    2015031358 A1    3/2015

OTHER PUBLICATIONS

International Search Report and Written Opinion; International Application No. PCT/US2016/021808; International Filing Date: Mar. 10, 2016; dated Jun. 9, 2016; 14 Pages.
(Continued)

*Primary Examiner* — Jonathan M Dager
(74) *Attorney, Agent, or Firm* — Cantor Colburn LLP

(57) ABSTRACT

A method of trajectory control for a vehicle includes obtaining an initial trajectory; presenting the initial trajectory as a current trajectory on an I/O device, the current trajectory presented overlaying terrain; initiating travel of the vehicle along the current trajectory; updating the current trajectory and the terrain in real time as the vehicle travels along the current trajectory; determining if change in the current trajectory is required; changing the current trajectory to an altered trajectory in response to determining change in the current trajectory is required; and presenting the altered trajectory on the I/O device, the altered trajectory presented overlaying the terrain.

13 Claims, 4 Drawing Sheets

(51) Int. Cl.
*G08G 5/04* (2006.01)
*B64C 13/16* (2006.01)
*B64C 39/02* (2006.01)
*G01S 13/935* (2020.01)

(52) U.S. Cl.
CPC ......... *G08G 5/0021* (2013.01); *G08G 5/0039* (2013.01); *G08G 5/0052* (2013.01); *G08G 5/0086* (2013.01); *G08G 5/045* (2013.01); *B64C 2201/108* (2013.01); *B64C 2201/141* (2013.01); *G01S 13/935* (2020.01)

(56) References Cited

U.S. PATENT DOCUMENTS

| | | | | |
|---|---|---|---|---|
| 6,643,580 | B1* | 11/2003 | Naimer | G01C 21/005 244/1 R |
| 6,985,091 | B2* | 1/2006 | Price | G01C 23/005 340/966 |
| 7,209,070 | B2* | 4/2007 | Gilliland | G01C 5/00 342/179 |
| 7,375,678 | B2* | 5/2008 | Feyereisen | G01C 23/00 342/180 |
| 7,483,790 | B2* | 1/2009 | Brent | G01C 23/005 701/122 |
| 7,487,039 | B2* | 2/2009 | Rumbo | G08G 5/0034 340/995.19 |
| 7,609,200 | B1* | 10/2009 | Woodell | G01S 13/935 342/176 |
| 7,737,878 | B2 | 6/2010 | Van Tooren et al. | |
| 7,852,236 | B2* | 12/2010 | Feyereisen | G01C 5/005 340/945 |
| 7,917,289 | B2* | 3/2011 | Feyereisen | G01C 23/005 701/3 |
| 7,965,202 | B1* | 6/2011 | Chiew | G01C 23/00 340/973 |
| 8,027,783 | B2* | 9/2011 | Closse | G08G 5/025 340/976 |
| 8,049,644 | B1* | 11/2011 | Oehlert | G06T 17/05 340/963 |
| 8,095,249 | B2* | 1/2012 | Little | G01C 23/005 340/963 |
| 8,200,433 | B1* | 6/2012 | Siniff | G01C 23/00 340/995.1 |
| 8,229,662 | B2* | 7/2012 | Subelet | G08G 5/045 342/63 |
| 8,232,910 | B1* | 7/2012 | Burton | G08G 5/0026 342/29 |
| 8,279,108 | B2* | 10/2012 | Nouvel | G01C 5/005 340/945 |
| 8,285,427 | B2* | 10/2012 | Rogers | G01C 23/00 340/945 |
| 8,339,284 | B2* | 12/2012 | He | G01C 23/005 340/945 |
| 8,457,889 | B2* | 6/2013 | Feyereisen | G01C 21/00 701/467 |
| 8,576,094 | B2* | 11/2013 | Suddreth | G08G 5/0021 340/972 |
| 8,654,149 | B2* | 2/2014 | He | G01C 23/005 345/632 |
| 9,340,282 | B2* | 5/2016 | Case | G01C 5/005 |
| 9,390,559 | B2* | 7/2016 | Feyereisen | B64D 45/00 |
| 9,489,758 | B2* | 11/2016 | Ott | G01C 23/00 |
| 9,495,878 | B2* | 11/2016 | Kozlow | G08G 5/0039 |
| 9,733,103 | B2* | 8/2017 | He | G01C 21/00 |
| 9,762,895 | B1* | 9/2017 | Henry | H04N 13/366 |
| 9,824,598 | B2* | 11/2017 | Onomura | G01S 13/933 |
| 9,892,489 | B1* | 2/2018 | Roggendorf | G06T 3/60 |
| 9,898,933 | B2* | 2/2018 | Pire | G08G 5/045 |
| 10,228,691 | B1* | 3/2019 | Pounds | G01S 7/20 |
| 2001/0023390 | A1 | 9/2001 | Gia | |
| 2002/0143439 | A1* | 10/2002 | Morizet | G01C 23/00 701/3 |
| 2003/0107499 | A1* | 6/2003 | Lepere | G01C 5/005 340/945 |
| 2003/0122701 | A1* | 7/2003 | Tran | G08G 5/0052 342/29 |
| 2003/0156046 | A1* | 8/2003 | Dwyer | G01C 23/00 340/973 |
| 2003/0195672 | A1* | 10/2003 | He | G01C 23/00 701/3 |
| 2003/0222887 | A1* | 12/2003 | Wilkins, Jr. | G01C 23/005 345/618 |
| 2004/0160341 | A1* | 8/2004 | Feyereisen | G01C 23/00 340/970 |
| 2004/0178943 | A1* | 9/2004 | Niv | G01S 13/50 342/29 |
| 2004/0217883 | A1* | 11/2004 | Judge | G01C 23/00 340/946 |
| 2004/0239529 | A1* | 12/2004 | Tran | G08G 5/0078 340/961 |
| 2005/0049763 | A1* | 3/2005 | Walsdorf | B64D 45/04 701/9 |
| 2005/0099433 | A1* | 5/2005 | Berson | B64D 47/08 345/619 |
| 2005/0182528 | A1* | 8/2005 | Dwyer | G01C 23/00 701/3 |
| 2005/0261808 | A1* | 11/2005 | Artini | G01C 23/00 701/3 |
| 2005/0273248 | A1* | 12/2005 | Artini | G05D 1/0646 701/120 |
| 2005/0273249 | A1* | 12/2005 | Artini | G05D 1/0646 701/120 |
| 2006/0158350 | A1 | 7/2006 | Glover | |
| 2006/0227012 | A1* | 10/2006 | He | G01C 23/005 340/945 |
| 2006/0235581 | A1* | 10/2006 | Petillon | B64D 45/04 701/3 |
| 2007/0005199 | A1* | 1/2007 | He | G01C 23/00 701/16 |
| 2007/0055418 | A1* | 3/2007 | Pire | G08G 5/0086 701/14 |
| 2007/0067093 | A1* | 3/2007 | Pepitone | G01C 23/005 701/120 |
| 2007/0085705 | A1* | 4/2007 | He | G01C 23/00 340/967 |
| 2007/0171094 | A1* | 7/2007 | Alter | G01C 23/00 340/970 |
| 2007/0265776 | A1* | 11/2007 | Meunier | G08G 5/0021 701/301 |
| 2008/0051947 | A1* | 2/2008 | Kemp | B64D 45/0015 701/3 |
| 2008/0208400 | A1* | 8/2008 | Bouchet | G01C 23/00 701/4 |
| 2008/0243383 | A1* | 10/2008 | Lin | G08G 5/0078 701/469 |
| 2009/0177400 | A1* | 7/2009 | Silly | G05D 1/0646 701/301 |
| 2010/0017113 | A1* | 1/2010 | Artini | G01C 5/005 701/3 |
| 2010/0026525 | A1* | 2/2010 | Feyereisen | G01C 5/005 340/972 |
| 2010/0030405 | A1* | 2/2010 | He | G01C 23/00 701/14 |
| 2010/0042273 | A1* | 2/2010 | Meunier | G01C 23/005 701/9 |
| 2010/0052949 | A1* | 3/2010 | Suddreth | G01C 23/00 340/995.19 |
| 2010/0060511 | A1* | 3/2010 | Nouvel | G01C 23/00 342/29 |
| 2010/0066566 | A1 | 3/2010 | Reusser et al. | |
| 2010/0240988 | A1* | 9/2010 | Varga | G02B 27/017 600/425 |
| 2010/0250022 | A1 | 9/2010 | Hines et al. | |
| 2011/0022291 | A1* | 1/2011 | He | G01C 23/05 701/120 |
| 2011/0210871 | A1* | 9/2011 | Flotte | G01C 23/00 340/961 |

(56) References Cited

U.S. PATENT DOCUMENTS

| | | | |
|---|---|---|---|
| 2011/0227944 A1* | 9/2011 | Feyereisen | G06T 11/00 345/632 |
| 2011/0288695 A1 | 11/2011 | Gariepy et al. | |
| 2012/0026190 A1* | 2/2012 | He | G01C 21/00 345/633 |
| 2012/0075168 A1* | 3/2012 | Osterhout | G02B 27/017 345/8 |
| 2013/0002454 A1* | 1/2013 | Burns | G01C 23/00 340/975 |
| 2013/0162632 A1* | 6/2013 | Varga | G06T 19/006 345/419 |
| 2013/0270394 A1 | 10/2013 | Downs et al. | |
| 2013/0338858 A1* | 12/2013 | Cherepinsky | G06F 16/285 701/3 |
| 2014/0331161 A1* | 11/2014 | Venkataswamy | G06F 3/0484 715/771 |
| 2015/0310746 A1* | 10/2015 | Albert | G08G 5/0047 701/3 |
| 2015/0323932 A1* | 11/2015 | Paduano | G05D 1/042 701/3 |
| 2016/0078769 A1* | 3/2016 | Coulmeau | G08G 5/0034 701/537 |
| 2016/0140850 A1* | 5/2016 | Feyereisen | G01C 23/005 701/532 |
| 2016/0232793 A1* | 8/2016 | Morishita | G08G 5/0026 |
| 2018/0099748 A1* | 4/2018 | Lesperance | B64C 39/024 |
| 2018/0350258 A1* | 12/2018 | He | G01C 23/005 |
| 2019/0002122 A1* | 1/2019 | Ding | G05D 1/0676 |
| 2019/0079509 A1* | 3/2019 | Bosworth | B64D 1/08 |

OTHER PUBLICATIONS

European Search Report for Application No. 16765465.6; dated Oct. 26, 2018; 8 pages.

* cited by examiner

TRAJECTORY CONTROL OF A VEHICLE

CROSS REFERENCE TO RELATED APPLICATIONS

This application is a National Stage application of PCT/US2016/021808, filed Mar. 10, 2016, which claims the benefit of U.S. Provisional Patent Application No. 62/134,322, filed Mar. 17, 2015, both of which are incorporated by reference in their entirety herein.

BACKGROUND OF THE INVENTION

The subject matter disclosed herein relates generally to controlling travel of a vehicle, and in particular to controlling travel of a vehicle using a trajectory.

Vehicles, such as aircraft, are traditionally controlled by a pilot controlling the basic vehicle state. For example, in existing aircraft the pilot may control flight surfaces of the aircraft along with power output(s). This type of aircraft control may be used with manned aircraft, or autonomous aircraft, such as optionally-piloted vehicles (OPVs) and unmanned aerial vehicles (UAVs). As aircraft become more sophisticated, it is desirable to reduce pilot workload in controlling the aircraft states, and provide a system that allows the pilot to focus on the current mission rather than the basic states of the aircraft.

BRIEF DESCRIPTION OF THE INVENTION

According to an aspect of the invention, a method of trajectory control for a vehicle includes obtaining an initial trajectory; presenting the initial trajectory as a current trajectory on an I/O device, the current trajectory presented overlaying terrain; initiating travel of the vehicle along the current trajectory; updating the current trajectory and the terrain in real time as the vehicle travels along the current trajectory; determining if change in the current trajectory is required; changing the current trajectory to an altered trajectory in response to determining change in the current trajectory is required; and presenting the altered trajectory on the I/O device, the altered trajectory presented overlaying the terrain.

In addition to one or more of the features described above or below, or as an alternative, further embodiments could include wherein the terrain is presented on the I/O device in a three dimensional representation.

In addition to one or more of the features described above or below, or as an alternative, further embodiments could include wherein determining if change in the current trajectory is required is in response to a sensor sensing an obstacle along the current trajectory.

In addition to one or more of the features described above or below, or as an alternative, further embodiments could include wherein determining if change in the current trajectory is required is in response to the I/O device initiating change in the current trajectory.

In addition to one or more of the features described above or below, or as an alternative, further embodiments could include wherein the terrain is derived from at least one of a stored terrain map and an image from a sensor.

In addition to one or more of the features described above or below, or as an alternative, further embodiments could include wherein obtaining the initial trajectory includes determining the initial trajectory in response to a destination, at least one travel parameter and vehicle constraints.

In addition to one or more of the features described above or below, or as an alternative, further embodiments could include wherein the travel parameter includes an operational mode for the vehicle.

In addition to one or more of the features described above or below, or as an alternative, further embodiments could include wherein the vehicle is an aircraft.

According to an aspect of the invention, a system for trajectory control for a vehicle includes a processing subsystem; and memory having instructions stored thereon that, when executed by the processing subsystem, cause the system to execute operations including: obtaining an initial trajectory; presenting the initial trajectory as a current trajectory on an I/O device, the current trajectory presented overlaying terrain; initiating travel of the vehicle along the current trajectory; updating the current trajectory and the terrain in real time as the vehicle travels along the current trajectory; determining if change in the current trajectory is required; changing the current trajectory to an altered trajectory in response to determining change in the current trajectory is required; and presenting the altered trajectory on the I/O device, the altered trajectory presented overlaying the terrain.

In addition to one or more of the features described above or below, or as an alternative, further embodiments could include wherein determining if change in the current trajectory is required is in response to a sensor sensing an obstacle along the current trajectory.

In addition to one or more of the features described above or below, or as an alternative, further embodiments could include wherein determining if change in the current trajectory is required is in response to the I/O device initiating change in the current trajectory.

In addition to one or more of the features described above or below, or as an alternative, further embodiments could include wherein the terrain is derived from at least one of a stored terrain map and an image from a sensor.

In addition to one or more of the features described above or below, or as an alternative, further embodiments could include wherein obtaining the initial trajectory includes determining the initial trajectory in response to a destination, at least one travel parameter and vehicle constraints.

In addition to one or more of the features described above or below, or as an alternative, further embodiments could include wherein the travel parameter includes an operational mode for the vehicle.

In addition to one or more of the features described above or below, or as an alternative, further embodiments could include wherein the vehicle is an aircraft.

Embodiments provide the technical effect of providing vehicle control using trajectory, and modifying the trajectory in response to user input and/or sensed conditions.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

In exemplary embodiments, trajectory control of a vehicle is used to establish and edit a flight path of an aircraft. Trajectory control may be implemented within autonomous aircraft, such as optionally-piloted vehicles (OPVs) and unmanned aerial vehicles (UAVs), and/or may be provided to assist a human-piloted aircraft. Furthermore, trajectory control can be implemented to control a travel path in any type of vehicle, including an aircraft, watercraft, spacecraft, or land vehicle.

Figure 1:
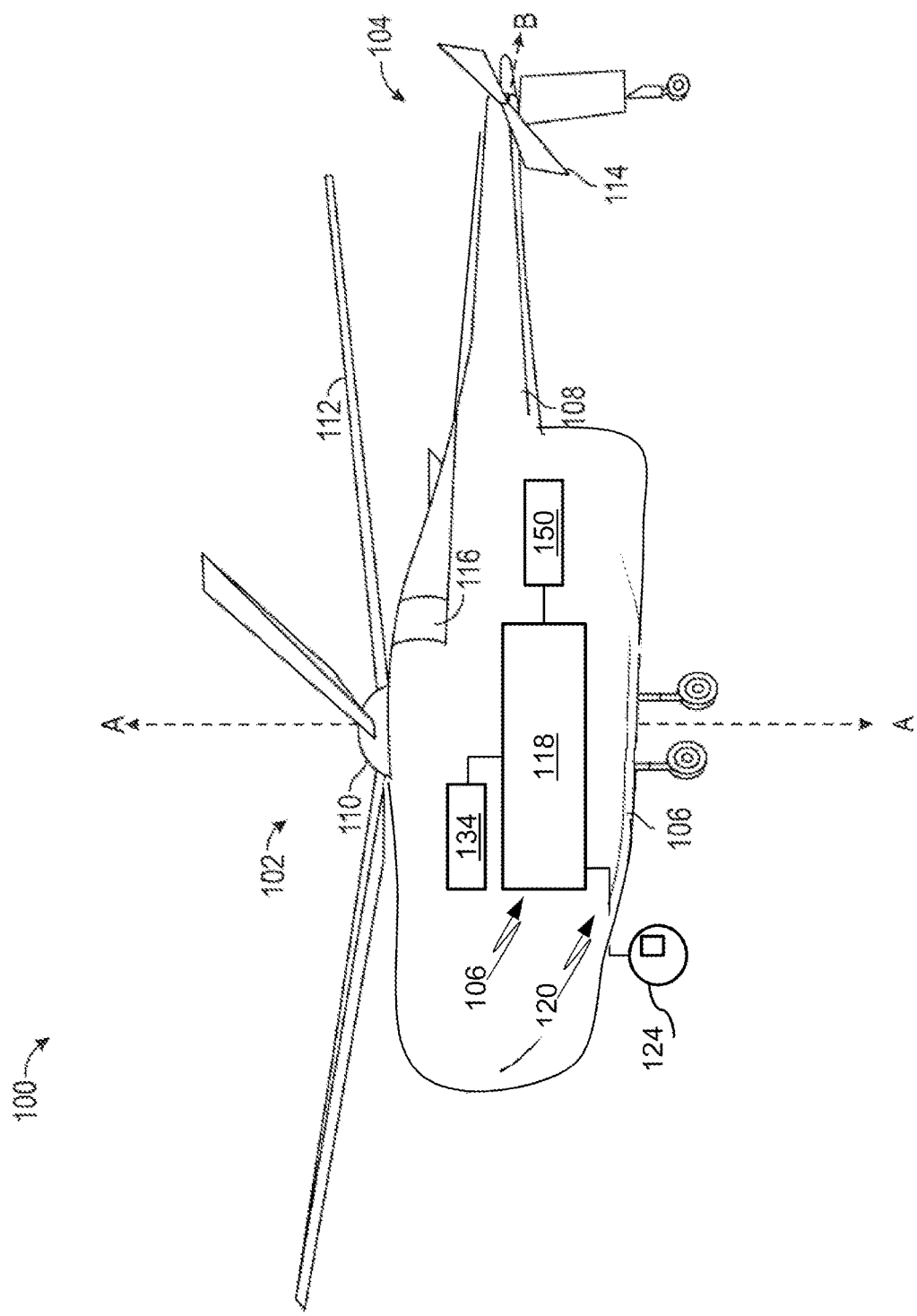
FIG. 1 depicts a rotary wing aircraft according to an exemplary embodiment.

Referring now to the drawings, FIG. 1 is a perspective view of an exemplary vehicle, in the form of an aircraft 100. Aircraft 100 is an autonomous rotary-wing unmanned aerial vehicle (UAV) 100 (also referred to as "autonomous UAV 100" or "aircraft 100") including trajectory control according to an embodiment of the invention. It is understood that the trajectory control described herein may be used with manned aircraft or OPVs, as well as UAVs 100, and other types of vehicles.

As illustrated, the autonomous UAV 100 is an aircraft that includes a main rotor system 102, an anti-torque system, for example, a tail rotor system 104, and a control system 106. The main rotor system 102 is attached to an airframe 108 and includes a rotor hub 110 having a plurality of blades 112 that rotate about axis A. Also, the tail rotor system 104 is attached aft of the main rotor system 102 and includes a plurality of blades 114 that rotate about axis B (which is orthogonal to axis A). The main rotor system 102 and the tail rotor system 104 are driven to rotate about their respective axes A, B by one or more turbine engines 116 through gearboxes (not shown). Although a particular configuration of an autonomous UAV 100 is illustrated as a rotary wing UAV and described in the disclosed embodiments, it will be appreciated that other configurations and/or machines including autonomous, semi-autonomous, and human-controlled vehicles that may operate in land or water including fixed-wing aircraft, rotary-wing aircraft, marine vessels (e.g., submarines, ships, etc.), and land vehicles (e.g., trucks, cars, etc.) for docking, parking, or autonomous positioning may also benefit from embodiments disclosed herein.

The control system 106 includes a vehicle computer system 118 (FIG. 2) having one or more processing resources and memory. The sensing system 120 may be attached to or incorporated within the airframe 108. The sensing system 120 includes one or more fixed sensors and/or directional sensors 124. The vehicle computer system 118 processes, in one non-limiting embodiment, raw data acquired through the sensing system 120 while the autonomous UAV 100 is airborne.

In an embodiment, the sensor 124 may be one or more of: a LIDAR scanner, a video camera, a multi-spectral camera, a stereo camera system, a structure light-based 3D/depth sensor, a time-of-flight camera, a LADAR scanner, a RADAR scanner, a phased array sensor, or the like in order to capture sensor data within a field of view to assist in vehicle navigation. Additionally, the autonomous UAV 100 may include a navigation system 134, such as, for example, an inertial measurement unit (IMU) that may be used to acquire positional data related to a current rotation and acceleration of the autonomous UAV 100 in order to determine a geographic location of autonomous UAV 100, including a change in position of the autonomous UAV 100. The navigation system 134 can also or alternatively include a global positioning system (GPS) or the like to enhance positional awareness of the autonomous UAV 100. The navigation system 134 in combination with the sensor data may be used to alter a trajectory of the autonomous UAV 100. Sensor data from the sensing system 120 may also be relayed to other vehicles or control stations (not depicted) via a communication interface 150.

Figure 2:
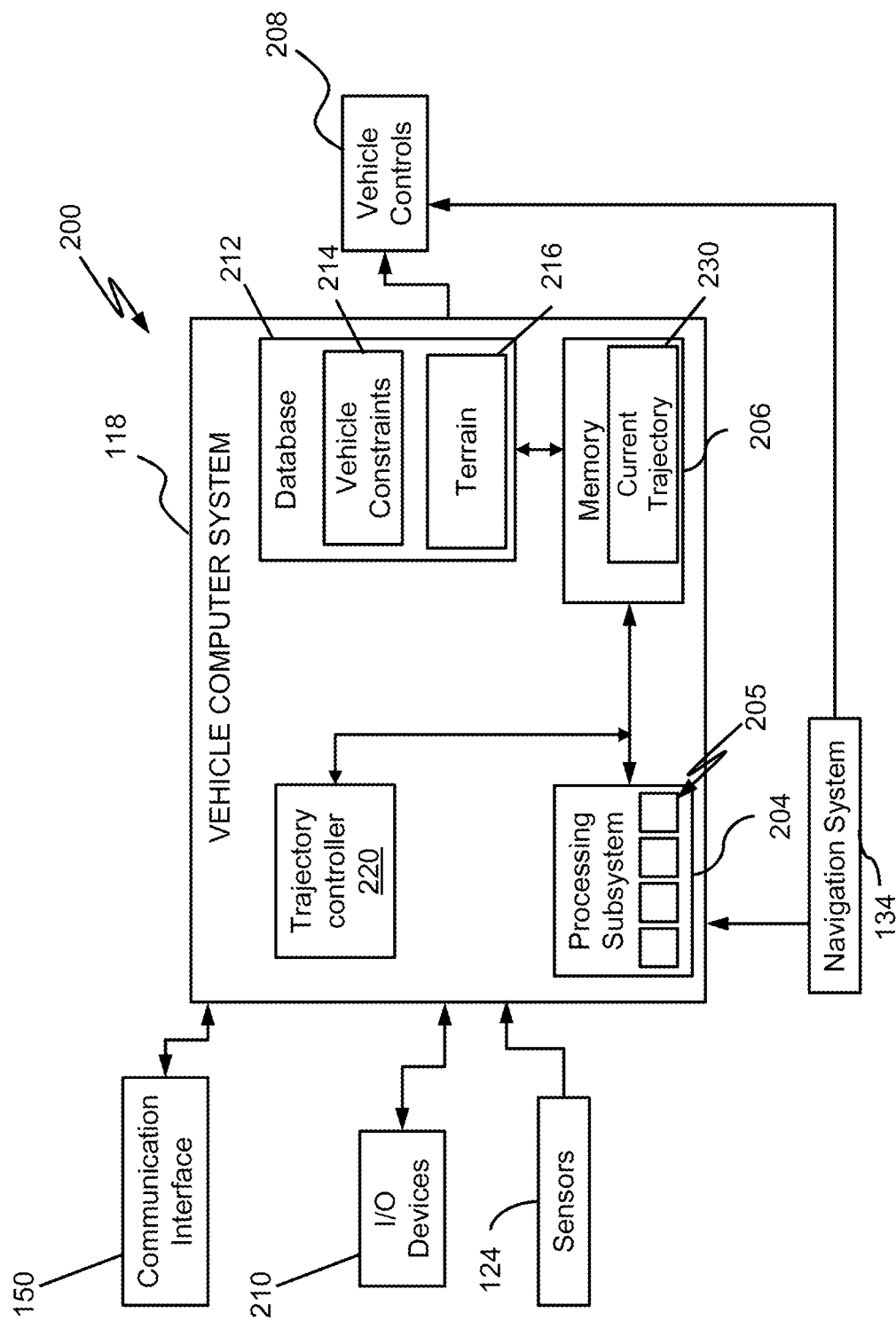
FIG. 2 is a schematic view of a system according to an exemplary embodiment.

FIG. 2 illustrates a schematic block diagram of a system 200 for trajectory control of the autonomous UAV 100 of FIG. 1 according to an exemplary embodiment. The system 200 is an embodiment of the control system 106 of FIG. 1. As illustrated, the system 200 includes the vehicle computer system 118 that executes instructions for implementing a trajectory controller 202. The vehicle computer system 118 receives sensor data indicative of current conditions using the sensors 124. As depicted in FIG. 2, the vehicle computer system 118 includes a memory 206 that communicates with a processing subsystem 204. The memory 206 is an example of a non-transitory computer readable storage medium tangibly embodied in the vehicle computer system 118 including executable instructions stored therein, for instance, as firmware. Also, in embodiments, memory 206 may include random access memory (RAM), read-only memory (ROM), or other electronic, optical, magnetic or any other computer readable medium onto which instructions and data are stored.

A trajectory controller 220 manages the aircraft trajectory, as described herein. Trajectory controller 220 may be implemented by processing subsystem 204, or by a separate, processor-based controller executing computer code stored in memory 206. The current trajectory 230 is generated by trajectory controller 220 and stored in the memory 206.

The processing subsystem 204 may include any number and type of processors, including a general purpose processor, a digital signal processor, a microcontroller, an application specific integrated circuit, a field programmable gate array, or the like. In an exemplary embodiment, the processing subsystem 204 includes a plurality of processing resources 205, which may be separate cores, processing circuits, and/or processors supporting parallel computing. Although depicted as singular blocks, the processing subsystem 204 and memory 206 can be distributed between multiple processing circuits and memory subsystems. In an embodiment, the processing subsystem 204 performs additional processing tasks for the system 200.

The system 200 may include a database 212 to store a variety of data, such as the vehicle constraints 214 and terrain maps 216, and the like. The vehicle constraints 214 may define a variety of limits associated with flight dynamics and limits of maneuverability of the autonomous UAV 100 of FIG. 1. The terrain maps 216 includes two-dimensional and/or three-dimensional terrain maps used to define a trajectory and/or edit a trajectory as described in further detail herein.

The system 200 may provide one or more controls, such as vehicle controls 208. Trajectory controller 220 can interface with the navigation system 134 and the I/O devices 210 to provide higher-level commands to the vehicle controls 208 to adjust engine controls, rotor controls, and the like. The trajectory controller 220 provides commands to the vehicle controls 208 to maintain the aircraft on the current trajectory. Vehicle controls 208 control flight surfaces and power of the aircraft 100 to stay on the current trajectory.

One or more input/output (I/O) devices 210 may be used in forming an initial trajectory and altering the trajectory during flight. The I/O devices 210 may include a display device or screen, audio speakers, a graphical user interface (GUI), pointing devices, control stick(s), etc. Creation of an initial trajectory and altering the current trajectory are described in further detail herein with reference to FIG. 3.

It is to be appreciated that the system 200 is illustrative. In some embodiments, additional components or entities not shown in FIG. 2 may be included. In some embodiments, one or more of the components or entities may be optional. In some embodiments, the components or entities of the system 200 may be arranged or configured differently from what is shown in FIG. 2.

Figure 3:
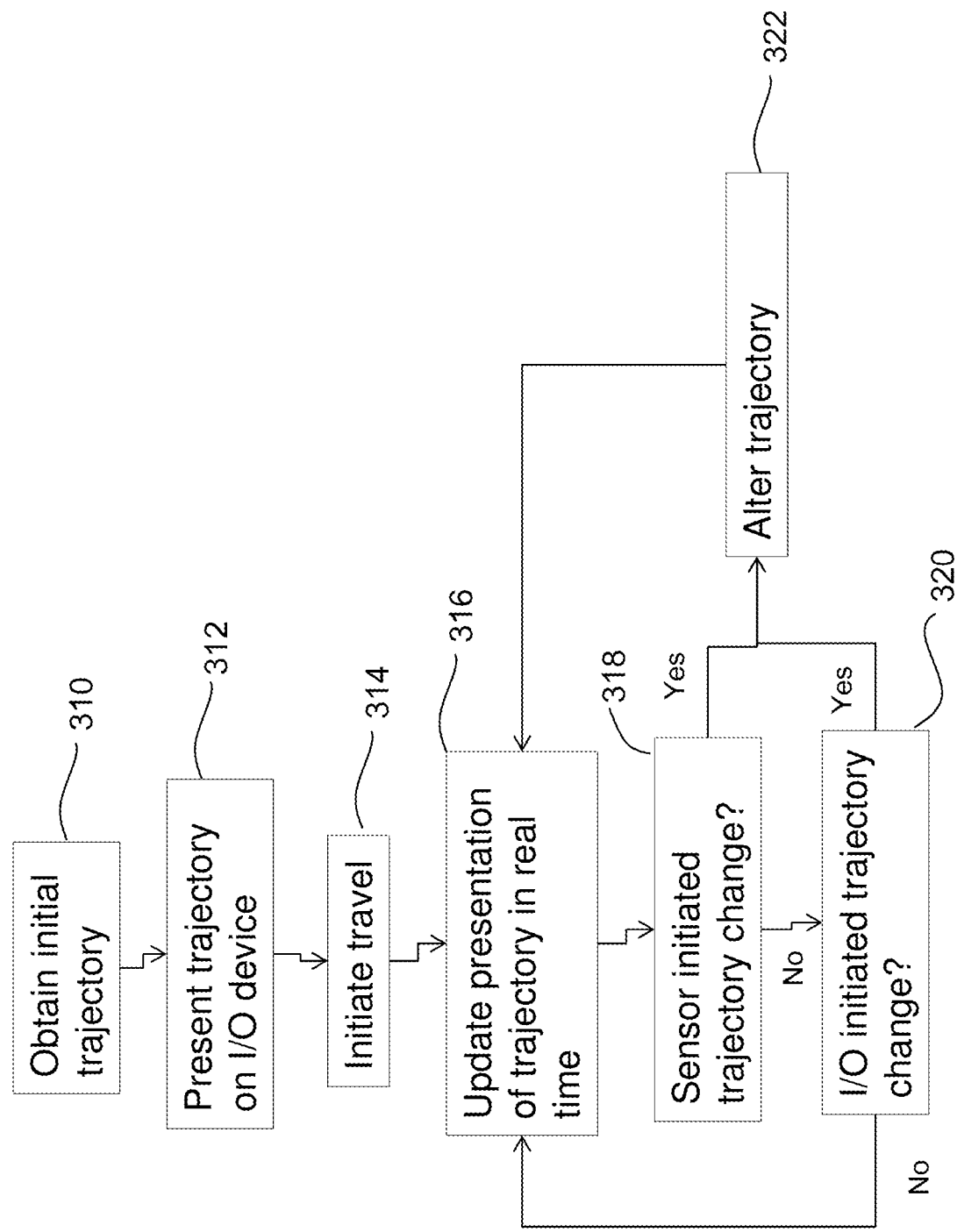
FIG. 3 is a flow chart of a process for trajectory control of a vehicle according to an exemplary embodiment.

FIG. 3 depicts a process for trajectory control of a vehicle in an exemplary embodiment. The process beings at block 310 where an initial trajectory is obtained. The initial trajectory may be obtained by an operator entering a destination for the vehicle through I/O device(s) 210. The operator may also specify travel parameters. For example, if the vehicle is an aircraft, a cruising altitude may be specified as a travel parameter. Other travel parameters may include modes of operation such as quiet mode, fastest route, most fuel efficient route, etc. The trajectory controller 220 uses the current location, destination and any travel parameters to determine the initial trajectory. The trajectory controller 220 uses terrain maps 216 to plot a trajectory that meets the travel parameters, while also complying with any vehicle constraints 214. The current trajectory defines a flight path, along with speed, altitude, etc.

Figure 4:
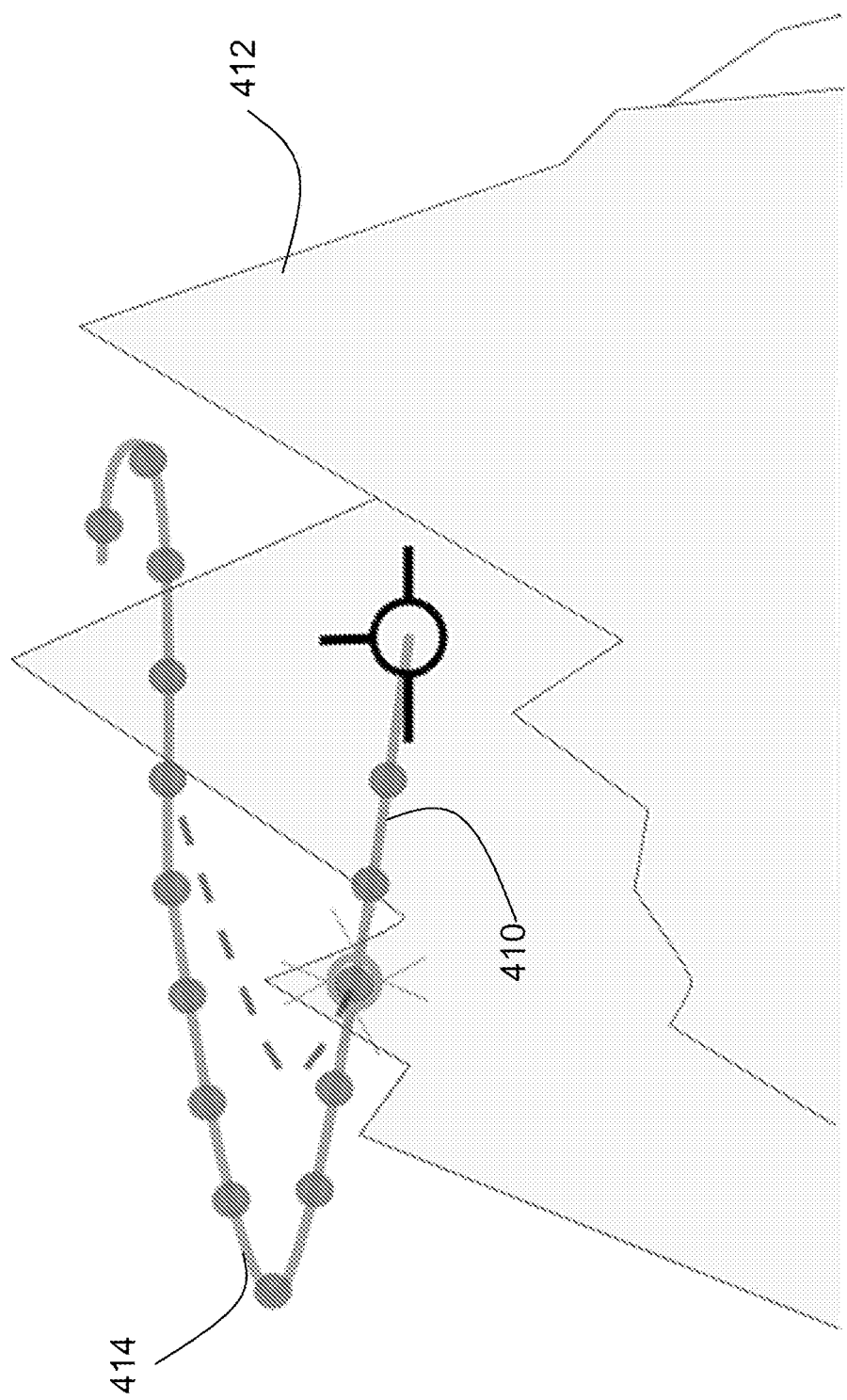
FIG. 4 illustrates alteration of a trajectory according to an exemplary embodiment.

At block 312, the initial trajectory is presented on I/O device 210. FIG. 4 depicts an exemplary initial trajectory 410. Trajectory 410 may be overlaid on 2D or 3D representations of terrain 412. The displayed terrain 412 may be obtained from maps of terrain 216 in database 212, from real time video acquired at sensors 124, or a merger of both. The I/O devices 210 may include helmet mounted displays, tablets and/or panel mounted displays to display real time trajectory information superimposed on a terrain image.

At block 314, travel of the vehicle commences. It is understood that the vehicle may initiate travel prior to presenting the trajectory at 312. As noted above, the trajectory controller 220 interfaces with the vehicle controls 208 and navigation system 134 to maintain the aircraft on the current trajectory. The trajectory is used as the travel path for the vehicle. The vehicle computer system 200 maintains the vehicle on the trajectory automatically, without the need for the operator to control status of the vehicle. Prior to any alterations in the trajectory, the initial trajectory is used as the current trajectory.

At block 316, the presentation of the trajectory is updated in real time as the vehicle travels. This entails changing the terrain 412 as the vehicle moves. The operator may also zoom in and out, to see the terrain and current trajectory at different scales.

As the vehicle is traveling, the system periodically determines if the trajectory needs to be changed. At block 318, it is determined if the sensors 124 have initiated a trajectory change. As noted above, the current trajectory may be derived based on terrain maps 216. The terrain maps 216 may not be 100% accurate (e.g., a cell tower has been erected since the terrain map was updated). Sensor(s) 124 are used to detect obstacles along the current trajectory and initiate a trajectory change if needed. At block 318, if a trajectory change is needed due to a sensed obstacle, the flow proceeds to block 322. At block 322, trajectory controller 220 alters the current trajectory to an altered trajectory based on the information from sensor(s) 124. The altered trajectory will meet the original destination, travel parameters, and any vehicle constraints 214. FIG. 4 depicts an altered trajectory 414, derived upon sensor(s) 124 detecting an obstacle along the current trajectory. Flow proceeds to block 316, where the altered trajectory is now used as the current trajectory in presentation in real time. The altered trajectory is now used as the flight path for the aircraft 100.

If sensor(s) 124 do not initiate a change in the current trajectory at 318, flow proceeds to 320 where the system determines if the I/O devices 210 have initiated a change in the trajectory. An operator may use I/O devices 210 to manually alter the current trajectory. The operator may wish to alter the current trajectory, the destination, or some other travel parameter (e.g., altitude). In one embodiment, an operator may use a pointing device to drag a section of the current trajectory to a new location. Other operator actions may be used to alter the current trajectory. If an I/O device 210 has initiated a trajectory change, flow proceeds to block 322 where the trajectory is altered by trajectory controller 220. At block 322, trajectory controller 220 alters the current trajectory to an altered trajectory based on the input from the I/O device 210. The altered trajectory will meet the destination, travel parameters, and any vehicle constraints 214. Flow proceeds to block 316, where the altered trajectory is now used as the current trajectory in presentation in real time. The altered trajectory is now used as the flight path for the aircraft 100.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of trajectory control for an autonomous aircraft including one of an optionally piloted vehicle (OPV) and an unmanned aerial vehicle (UAV), the method comprising:
    obtaining an initial trajectory;
    presenting the initial trajectory as a current trajectory on an I/O device, the current trajectory presented overlaying a terrain map;
    initiating travel of the autonomous aircraft along the current trajectory;
    sensing obstacles along the current trajectory and updating the terrain map in real time as the autonomous aircraft travels along the current trajectory;
    determining, through a trajectory controller, if change in the current trajectory is required;
    autonomously changing the current trajectory to an altered trajectory through the trajectory controller in response to the trajectory controller determining change in the current trajectory is required based on the presence of an obstacle; and
    presenting the altered trajectory on the I/O device, the altered trajectory presented overlaying the terrain.

2. The method of claim 1, wherein:
    the terrain is presented on the I/O device in a three dimensional representation.

3. The method of claim 1, wherein:
determining if change in the current trajectory is required is in response to the I/O device initiating change in the current trajectory.

4. The method of claim 1, wherein:
the terrain map is derived from at least one of a stored terrain map and an image from a sensor.

5. The method of claim 1, wherein:
obtaining the initial trajectory includes determining the initial trajectory in response to a destination, at least one travel parameter and autonomous aircraft constraints.

6. The method of claim 5 wherein:
the travel parameter includes an operational mode for the autonomous aircraft.

7. The method of claim 1 wherein:
the autonomous aircraft comprises a rotary wing aircraft.

8. A system for trajectory control for an autonomous aircraft including one of one of an optionally piloted vehicle (OPV) and an unmanned aerial vehicle (UAV), the system comprising:
a processing subsystem; and
memory having instructions stored thereon that, when executed by the processing subsystem, cause the system to execute operations including:
obtaining an initial trajectory;
presenting the initial trajectory as a current trajectory on an I/O device, the current trajectory presented overlaying a terrain map;
initiating travel of the autonomous aircraft along the current trajectory;
sensing obstacles along the current trajectory and updating the terrain map in real time as the autonomous aircraft travels along the current trajectory;
determining, through a trajectory controller, if change in the current trajectory is required;
autonomously changing the current trajectory to an altered trajectory through the trajectory controller in response to the trajectory controller determining change in the current trajectory is required based on the presence of an obstacle; and
presenting the altered trajectory on the I/O device, the altered trajectory presented overlaying the terrain.

9. The system of claim 8, wherein:
determining if change in the current trajectory is required is in response to the I/O device initiating change in the current trajectory.

10. The system of claim 8, wherein:
the terrain map is derived from at least one of a stored terrain map and an image from a sensor.

11. The system of claim 8, wherein:
obtaining the initial trajectory includes determining the initial trajectory in response to a destination, at least one travel parameter and autonomous aircraft constraints.

12. The system of 13 wherein:
the travel parameter includes an operational mode for the autonomous aircraft.

13. The system of claim 8, wherein:
the autonomous aircraft comprises a rotary wing aircraft.

* * * * *